US010103525B2

(12) United States Patent
Baptiste

(10) Patent No.: US 10,103,525 B2
(45) Date of Patent: Oct. 16, 2018

(54) CABLE HANDLING APPARATUS AND METHOD

(71) Applicant: Freeport-McMoRan Inc., Phoenix, AZ (US)

(72) Inventor: Frank E. Baptiste, Phoenix, AZ (US)

(73) Assignee: Freeport-McMoRan Inc., Phoenix, AZ (US)

( * ) Notice: Subject to any disclaimer, the term of this patent is extended or adjusted under 35 U.S.C. 154(b) by 0 days.

(21) Appl. No.: 15/618,532

(22) Filed: Jun. 9, 2017

(65) Prior Publication Data

US 2018/0013269 A1    Jan. 11, 2018

Related U.S. Application Data

(60) Provisional application No. 62/358,784, filed on Jul. 6, 2016.

(51) Int. Cl.
*B25J 15/00* (2006.01)
*H02G 1/06* (2006.01)
*E21F 17/06* (2006.01)

(52) U.S. Cl.
CPC ............... *H02G 1/06* (2013.01); *B25J 15/00* (2013.01); *E21F 17/06* (2013.01); *H05K 999/99* (2013.01)

(58) Field of Classification Search
CPC .................................. H02G 1/06; B25J 15/00
USPC ..... 294/67.3, 37.5, 81.1, 81.4, 82.12, 82.21, 294/67.31; 248/74.1, 68.1
See application file for complete search history.

(56) References Cited

U.S. PATENT DOCUMENTS

| | | | | |
|---|---|---|---|---|
| 3,623,687 A * | 11/1971 | Nordstrom | ................ | F16L 3/08 174/169 |
| 4,526,414 A * | 7/1985 | Jones | .................... | A01K 97/06 294/143 |
| 4,657,284 A * | 4/1987 | Fiori | ....................... | F16L 23/10 24/205 |
| 4,892,276 A * | 1/1990 | Alessio | ................. | F16L 3/1008 16/231 |
| 5,553,666 A * | 9/1996 | Hartman | ............. | E21B 17/1035 166/241.7 |
| 6,001,002 A * | 12/1999 | Lea | ........................... | B24B 3/24 451/375 |
| 6,135,398 A * | 10/2000 | Quesnel | ............... | G02B 6/4471 248/74.1 |
| 6,336,249 B1 * | 1/2002 | Plumley | .................... | E05D 5/04 16/225 |
| 6,595,472 B1 * | 7/2003 | Pisczak | .................. | G02B 6/483 248/74.1 |
| 8,500,073 B2 * | 8/2013 | Quesnel | ................. | H02G 7/053 24/285 |
| 9,570,897 B2 * | 2/2017 | Dobrinski | .............. | H02G 7/125 |
| 2015/0021050 A1 * | 1/2015 | Foley | ........................ | B66C 1/44 166/385 |
| 2015/0229113 A1 * | 8/2015 | Dobrinski | .............. | H02G 7/125 174/42 |

* cited by examiner

*Primary Examiner* — Paul T Chin
(74) *Attorney, Agent, or Firm* — Fennemore Craig, P.C.

(57) ABSTRACT

A cable handling apparatus may include a frame and a first cable jaw mounted to the frame. A second cable jaw is pivotally mounted to the first cable jaw so that the first and second cable jaws may be pivoted with respect to one another between an opened position and a closed position. A lock assembly operatively associated with the first and second cable jaws locks said first and second cable jaws in the closed position.

12 Claims, 5 Drawing Sheets

CABLE HANDLING APPARATUS AND METHOD

CROSS-REFERENCE TO RELATED APPLICATION

This application claims the benefit of U.S. provisional patent application No. 62/358,784, filed on Jul. 6, 2016, which is hereby incorporated herein by reference for all that it discloses.

FIELD OF THE INVENTION

This invention relates to industrial and mining-related devices in general and more specifically to devices for handling and manipulating electrical service cables for electrically powered mining equipment.

BACKGROUND

Modern mining operations often involve the use of electrically powered machinery and equipment, such as shovels and drills, although other mine site equipment may be electrically powered as well. Such electrically powered equipment must be connected to the mine site electrical service by one or more electrical cables. As the mining operation progresses much of the mining equipment, including the electrically powered equipment, must be moved or relocated from time-to-time. Of course, the movement of electrically powered mining equipment typically requires the movement or relocation of the electrical service cables. However, most electrical service cables are comparatively large and heavy due to the high voltages and currents they must carry, thereby making them cumbersome and difficult to move. Accordingly, improvements in cable handling equipment are constantly being sought.

SUMMARY OF THE INVENTION

One embodiment of a cable handling apparatus according to the teachings of the present invention may include a frame and a first cable jaw mounted to the frame. A second cable jaw is moveably mounted to the first cable jaw so that the first and second cable jaws may be moved with respect to one another between an opened position and a closed position. A lock assembly operatively associated with the first and second cable jaws locks said first and second cable jaws in the closed position.

Also disclosed is a method of moving a cable that may include the steps of: Placing the cable between a pair of cable jaws that are moveably connected to one another so that the cable jaws may be moved between an opened position and a closed position, at least one of the cable jaws being mounted to a frame; moving the cable jaws to the closed position so that the cable is securely clamped between the cable jaws; locking the cable jaws in the closed position; moving the cable to a new location by means of the frame; unlocking the cable jaws; moving the cable jaws to the opened position; and removing the cable from the cable jaws.

BRIEF DESCRIPTION OF THE DRAWINGS

Illustrated and presently preferred exemplary embodiments of the invention are shown in the included drawings wherein:

FIG. 3b is a side elevation view of the jaw bracket illustrated in FIG. 3a;

DESCRIPTION OF THE INVENTION

The following description relates to various embodiments and elements of cable handling apparatus and methods for moving or relocating electrical service cables of the type commonly used in mining operations. The cable handling apparatus first may be engaged with the electrical service cable. The cable handling apparatus may then be secured or mounted to a cable moving system or vehicle, such as a truck, wheel loader, or backhoe, to allow the electrical service cable to be more easily moved or relocated to a new position.

Figure 1:
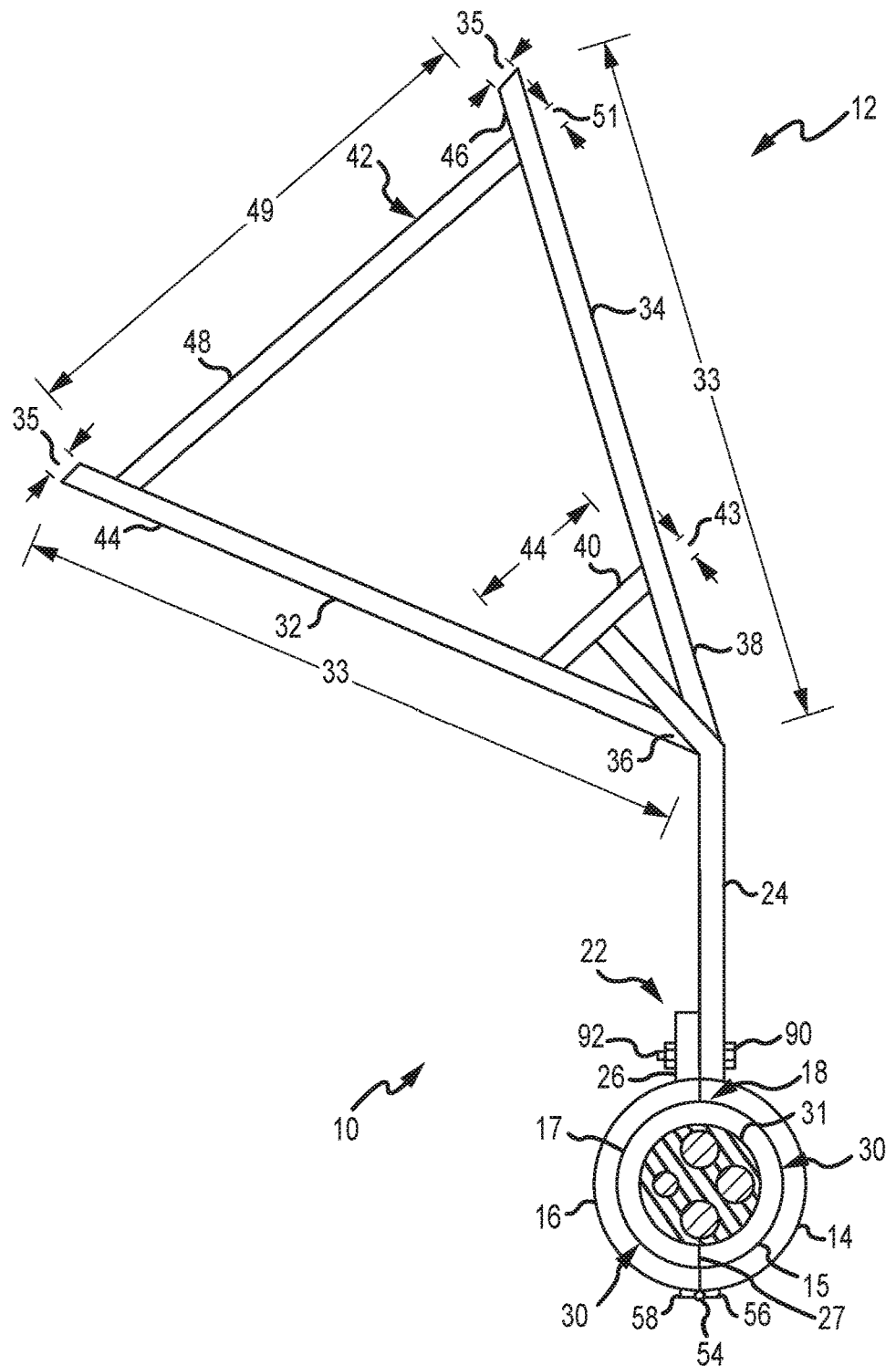
FIG. 1 is a side view of a cable handling apparatus according to the present invention with the cable jaws in the closed position.
Figure 2:
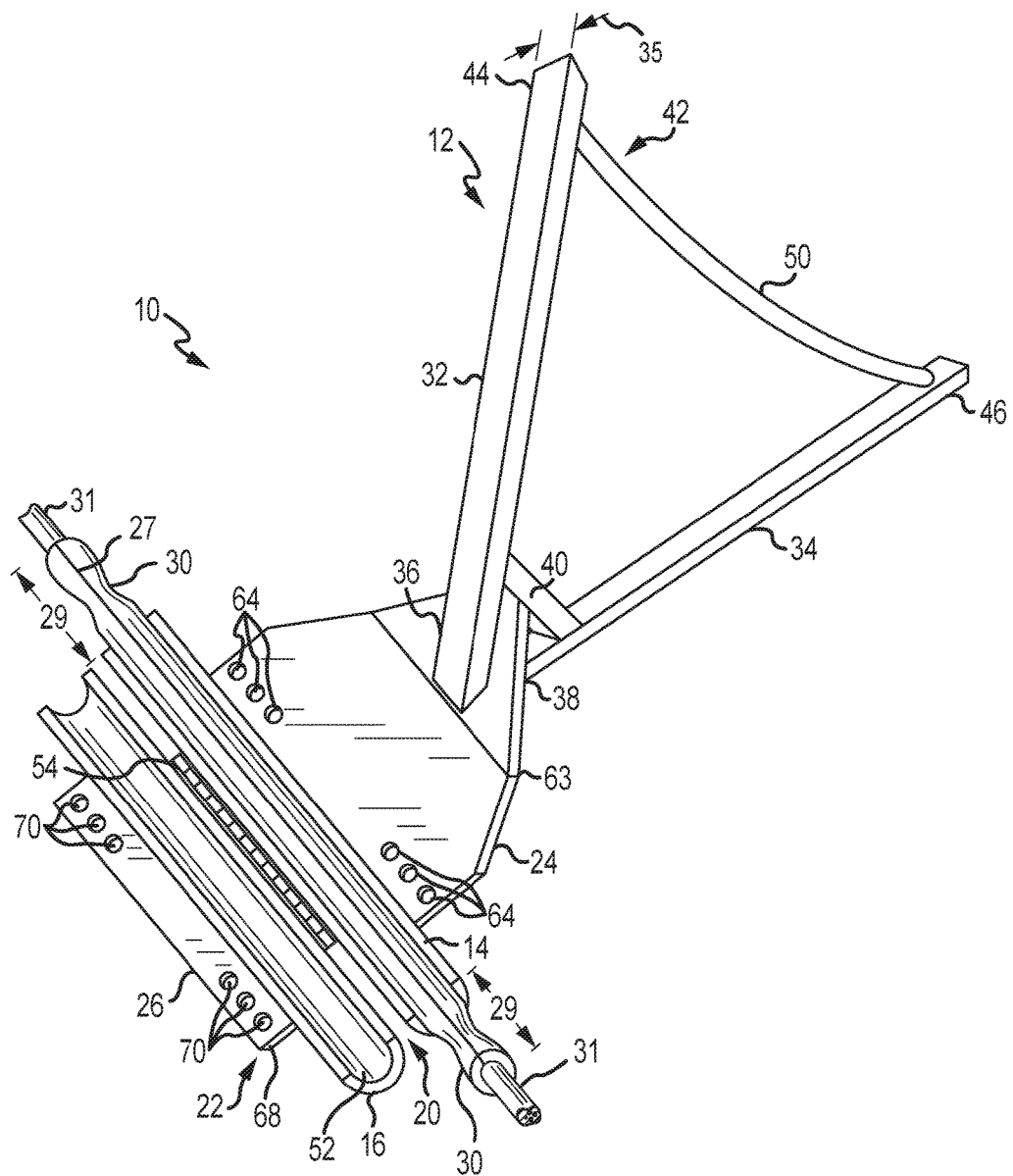
FIG. 2 is a perspective view of the cable handling apparatus illustrated in FIG. 1 with the cable jaws in the opened position.

Referring now to FIGS. 1 and 2, one embodiment of a cable handling apparatus 10 may comprise a frame 12 having a first cable jaw 14 fixedly mounted thereto. A second cable jaw 16 may be movably mounted to the first cable jaw 14 so that the first and second cable jaws 14 and 16 may be moved with respect to one another between a closed position 18 (shown in FIG. 1) and an opened position 20 (shown in FIG. 2). A lock assembly 22 operatively associated with the first and second cable jaws 14 and 16 may be used to lock or secure the first and second cable jaws 14 and 16 in the closed position 18.

In one embodiment, the lock assembly 22 may comprise a bracket 24 and a flange 26. The bracket 24 may be mounted between the first cable jaw 14 and frame 12, whereas the flange 26 may be mounted to the second cable jaw 16. The arrangement is such that the flange 26 abuts bracket 24 when the first and second cable jaws 14 and 16 are in the closed position 18, as best seen in FIG. 1. One or more fasteners 28 may be used to secure together bracket 24 and flange 26, thereby holding or locking the cable jaws 14, 16 in the closed position 18.

Cable handling apparatus 10 may also comprise a cable insulator 30. Cable insulator 30 may be sized to be received by cable jaws 14, 16 and fit over an electrical service cable 31 so that cable insulator 30 is interposed between electrical service cable 31 and cable jaws 16 and 16 when they are in the closed position 18. See FIG. 1. In one embodiment, cable insulator 30 may be provided with a longitudinal slit 27 therein to allow the cable insulter 30 to be placed around electrical service cable 31.

In one embodiment, frame 12 may comprise a generally A-shaped configuration having first and second arms 32 and 34. Respective proximal ends 36 and 38 of the first and second arms 32 and 34 may be fixedly mounted to bracket 24. See FIG. 1. A cross member 40 may be mounted to first and second arms 32 and 34 at a location between the proximal ends 36 and 38 and distal ends 44 and 46 of respective first and second arms 32 and 34. In one embodiment, cross member 40 may also be mounted to the bracket 24, as best seen in FIG. 1. A bail member 42 may be mounted at about the distal ends 44 and 46 of first and second arms 32 and 34.

Figure 5:
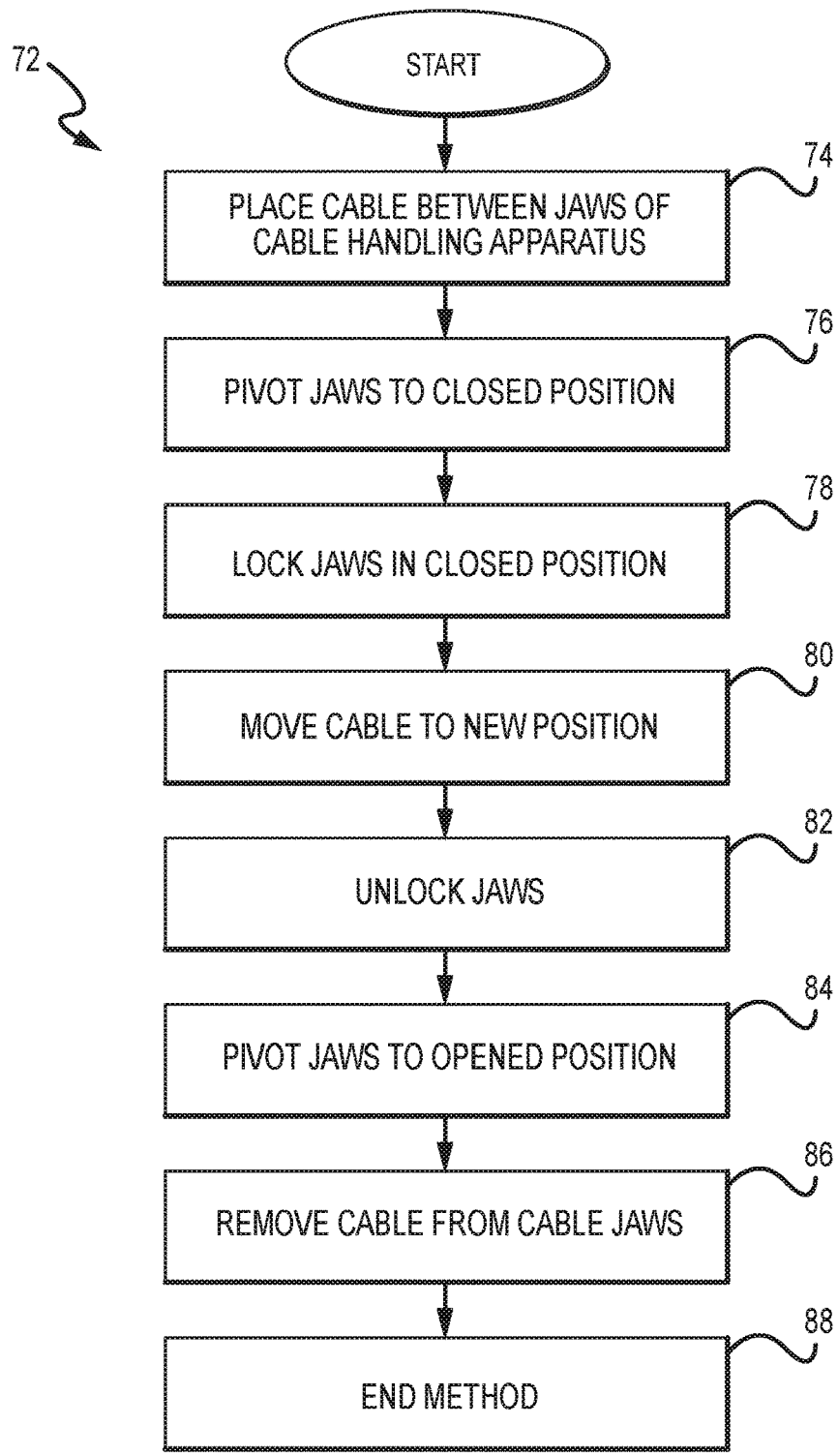
FIG. 5 is a flow chart representation of a method of moving a cable according to the teachings provided herein.

Referring now primarily to FIG. 5, a user (not shown) may use cable handling apparatus 10 in conjunction with a method or process 72 to move or relocate the electrical service cable 31. In a first step 74 of method 72, the user may position the electrical service cable 31 within the first cable jaw 14 of the cable handling apparatus 10. In an embodiment wherein the cable handling apparatus 10 is provided with a cable insulator 30, the user may first position the cable insulator 30 around electrical service cable 31 before positioning the assembly within first jaw 14. The user would then move the second cable jaw 16 to the closed position 18 in step 76 thereby closing the first and second cable jaws 14 and 16 around the electrical service cable 31 and insulator 30, if an insulator 30 is provided. In step 78, the user may lock the cable jaws 14, 16 in the closed position 18 by engaging the lock assembly 22, e.g., by using fasteners 28 to hold together bracket 24 and flange 26. The cable 31 may then be moved or relocated to a new position in step 80. In one embodiment, such movement may be accomplished by attaching the cable handling apparatus 10 to a suitable vehicle, such as a truck, wheel-loader, or backhoe. Once the electrical service cable 31 has been moved to the desired position, the user may unlock the lock assembly 22 at step 82, e.g., by removing fasteners 28, and thereafter move the jaws 14 and 16 to the opened position 20 at step 84. The electrical service cable 31 may then be removed from the cable handling apparatus 10 in step 86.

A significant advantage of the cable handling apparatus 10 of the present invention is that it provides a means for easily and conveniently moving electrical service cables. The cable handling apparatus 10 may be used to readily and safely secure the electrical service cable 31 to a vehicle, without having to resort to make-shift means, which was commonly the case. Further, the first and second cable jaws 14 and 16 distribute the forces required to move the service cable 31 over a large area, thereby reducing the likelihood of damage to service cable 31. Further, and particularly in embodiments that include a separate cable insulator 30, the generally elongated configuration of the cable jaws 14 and 16 cable insulator 30 reduce the likelihood that the electrical service cable 31 will become kinked or bent at a sharper radius than recommended for the particular service cable 31. Moreover, by providing a robust and reliable means for securing electrical service cables, the cable handling apparatus 10 will potentially reduce worksite injuries particularly when compared with the make-shift methods often used to move such cables.

Having briefly described one embodiment of the cable handling apparatus 10, as well as some of its more significant features and advantages, various embodiments and alternative configurations of the cable handling apparatus 10 and method 72 will now be described in detail. However, before proceeding with the description it should be noted that while the various embodiments of cable handling apparatus 10 are shown and described herein as they could be used in conjunction with electrical service cables of the type commonly used in mining operations, the cable handling apparatus 10 could be used in other environments and/or to move other types of cabling, as would become apparent to persons having ordinary skill in the art after having become familiar with the teachings provided herein. Consequently, the present invention should not be regarded as limited to the particular types of cables and applications shown and described herein.

Referring back now to FIGS. 1 and 2, and as briefly described above, one embodiment of the cable handling apparatus 10 may comprise a frame 12 having a first cable jaw 14 mounted thereto. A second cable jaw 16 may be movably mounted to the first cable jaw 14 so that the two jaws 14 and 16 may be moved with respect to one another between a closed position 18, illustrated in FIG. 1, and an opened position 20, illustrated in FIG. 2. Each of the first and second cable jaws 14, 16 may comprise a generally elongate member having a semi-cylindrical inside surface 52. The semi-cylindrical inside surfaces 52 may be sized to receive and securely grip electrical service cable 31 when the first and second cable jaws 14, 16 are in the closed position 18.

The first and second cable jaws 14, 16 may be made from any of a wide variety of materials, such as metal, plastic, or composite materials now known in the art or that may be developed in the future that are or would be suitable for the intended application. Consequently, the present invention should not be regarded as limited to any particular materials. However, by way of example, in one embodiment, first and second cable jaws 14 and 16 may comprise sections of a steel pipe cut in half (i.e., longitudinally).

The first and second cable jaws 14 and 16 are moveably mounted with respect to one another so that they can be moved between the closed and opened positions 18 and 20 in the manner described herein. While any of a wide range of devices and structural configurations may be used to moveably mount together the first and second cable jaws 14, in one embodiment the first and second cable jaws 14 and 16 are pivotally connected together by a hinge 54. More specifically, a first leaf 56 of hinge 54 is mounted to the first cable jaw 14 whereas a second leaf 58 of hinge 54 is mounted to the second cable jaw 16. Hinge 54 thereby mounts together first and second cable jaws 14 and 16 while allowing them to move, e.g., pivot, with respect to one another between the opened and closed positions 20 and 18.

Hinge 54 may comprise any of a wide variety of hinge types known in the art that would be suitable for the particular application, as would become apparent to persons having ordinary skill in the art after having become familiar with the teachings provided herein. Consequently, the present invention should not be regarded as limited to any particular type of hinge. However, by way of example, in one embodiment, hinge 54 comprises a continuous hinge having a length that is about equal to the lengths of the first and second cable jaws 14 and 16, as best seen in FIG. 2. Such a hinge 54 will provide full support along the lengths of the respective cable jaws 14 and 16 thereby reducing the likelihood of binding. In one embodiment, the continuous hinge 54 may be fabricated from steel, with the leaves 56, 58 thereof being welded to the first and second cable jaws 14 and 16.

Cable handling apparatus 10 may also be provided with a cable insulator 30 sized to be interposed between the service cable 31 and first and second cable jaws 14 and 16 when the same are in the closed position 18. Cable insulator 30 thereby provides additional mechanical and electrical protection for the service cable 31 when the same is clamped between first and second jaws 14 and 16. In the particular embodiment shown and described herein, cable insulator 30 may be provided with a longitudinal slit 27 therein to allow cable insulator 30 to be positioned around electrical service cable 31. Alternatively, cable insulator 30 may comprise two separate pieces or halves that are sized to fit over service cable 31 and received by the first and second cable jaws 14 and 16. It is generally preferred, but not required, that the cable insulator 30 be sized to extend beyond the respective ends of first and second cable jaws 14 and 16 by a distance 29, as best seen in FIG. 2. Such an extension provides service cable 31 with additional protection against abrasion and kinking. Cable insulator 30 may be fabricated from any of a wide range of materials, such as rubber or plastic, suitable for the particular application.

The cable handling apparatus 10 may also be provided with a lock assembly 22 to securely hold or lock the first and second cable jaws 14, 16 in the closed position 18. As previously described, in one embodiment lock assembly comprises a bracket 24, flange 26, and fasteners 28. Bracket 24 may be mounted between the first cable jaw 14 and frame 12, as shown in FIG. 1. In an alternative embodiment, the first cable jaw 14 may be mounted directly to frame 12 and bracket 24 mounted instead to first cable jaw 14. Flange 26 may be mounted to the second cable jaw 16. Bracket 24 and flange 26 are mounted so that they are generally aligned with one another and in abutting relation when the first and second cable jaws 14, 16 are in the closed position 18, as best seen in FIG. 1. One or more fasteners 28 may be used to secure or hold the first and second cable jaws 14 and 16 in the closed position 18.

Figure 3A:
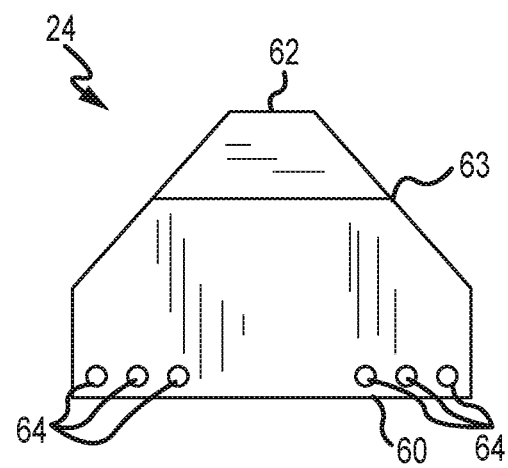
FIG. 3a is a plan view of a jaw bracket of the cable handling apparatus.
Figure 3B:
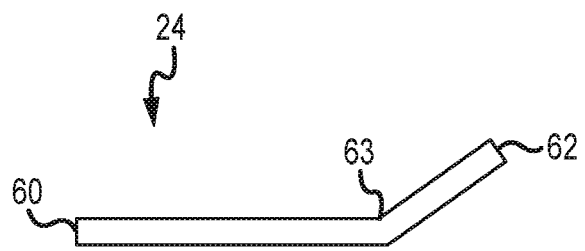

With reference now to FIGS. 3a and 3b, bracket 24 may comprise a generally plate-like member having first end 60 and a second end 62. The first end 60 of the bracket 24 may be configured to mount the first cable jaw 14, e.g., by welding, whereas second end 62 may be configured to mount to frame 12 and, optionally, to cross member 40, also by welding. See FIG. 1. In the particular embodiment shown and described herein, bracket 24 is provided with a bend 63 therein so that second end 62 is angled with respect to the first end 60. First end 60 of bracket 24 may also define one or more holes 64 therein that are sized to receive fasteners 28. In one embodiment, bracket 24 may be fabricated from mild steel, although other materials could also be used.

Figure 4:
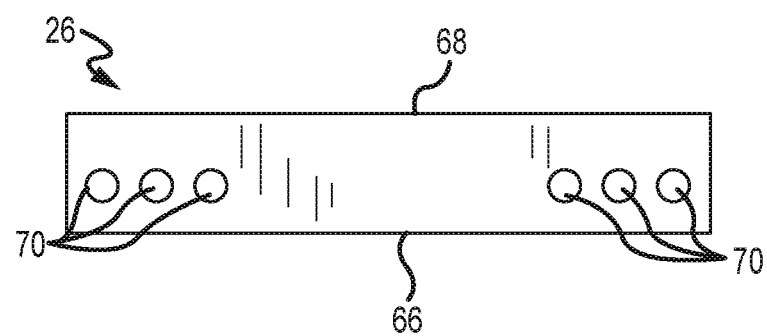
FIG. 4 is a plan view of a jaw flange of the cable handling apparatus.

Referring now to FIG. 4, flange 26 of lock assembly 22 may comprise a generally flat, plate-like member having a first end 66 and a second end 68. The first end 66 of flange 26 may be configured or adapted to be mounted to the second cable jaw 16, e.g., by welding. The flange 26 may also define one or more holes 70 therein that are sized to receive the fasteners 28 and spaced so that they are aligned with the holes 64 in bracket 24 when the first and second cable jaws 14 and 16 are in the closed position 18. As was the case for bracket 24, flange 26 also may be fabricated from mild steel, although other materials could be used.

When the first and second cable jaws 14 and 16 are moved to the closed position 18, the holes 70 provided in flange 26 will be aligned with the holes 64 provided in bracket 24. Thereafter, fasteners 28 may be inserted into the aligned holes 64, 70 and used to secure together the first and second cable jaws 14 and 16. In one embodiment, the fasteners 28 may comprise bolts 90 and nuts 92. Alternatively, other types of fasteners may be used, as would become apparent to persons having ordinary skill in the art after having become familiar with the teachings provided herein.

Referring back now primarily to FIGS. 1 and 2, the frame 12 may comprise a generally A-shaped configuration comprising first and second arms 32 and 34. Respective proximal ends 36 and 38 of the first and second arms 32 and 34 may be connected together and/or mounted to bracket 24, as best seen in FIG. 1. A cross member 40 may be mounted to first and second arms 32 and 34 at a location between the proximal ends 36, 38 and distal ends 44, 46 of respective first and second arms 32 and 34. In one embodiment, cross member 40 may also be mounted to the bracket 24, as best seen in FIG. 1. Cross-member 40 may be mounted to first and second arms 32 and 34 by any convenient means, such as by welding. Alternatively, any of a wide range of mechanical fasteners (e.g., screws or nuts and bolts) may also be used.

Frame 12 may also comprise a bail member 42 mounted to the distal ends 44 and 46 of first and second arms 32 and 34. Bail member 42 may be used to secure or mount the cable handling apparatus 10 to a cable moving system or vehicle (not shown) to facilitate movement of the electrical service cable 31. In the particular embodiment illustrated in FIG. 1, the bail member 42 may comprise a rigid member, such as a metal bar 48. Metal bar 48 may be attached to the distal ends 44 and 46 of first and second arms 32 and 34 by any convenient means, such as by welding or by mechanical fasteners. In another embodiment bail member 42 may comprise a flexible member, such as a rope 50 or a chain, as illustrated in FIG. 2. Rope 50 may comprise a braided polyethylene material, such as Dyneema® SK-75 fiber, available from any of a wide range of commercial vendors. Dyneema® is a registered trademark of DSM High Performance Fibers B.V., Netherlands.

First and second arms 32, 34 of the frame 12 may comprise metal tubes having a square cross-section. Each arm 32, 34 may have the same dimensions, with a length 33 of about 40.6 cm (about 16 in) and a width 35 of about 7.6 cm (about 3 in). Cross member 40 may also comprise a metal tube having a square cross-section, with a length 41 of about 7.6 cm (about 3 in) and a width of about 6.4 cm (about 2.5 in). In an embodiment wherein the bail member 42 comprises a rigid member (as opposed to a flexible member), bail member 42 may comprise a metal tube having a square cross-section with a length 49 of about 39.4 cm (about 15.5 in) and a width of about 7.6 cm (about 3 in).

Now referring to FIG. 5, and as previously described, the cable handling apparatus 10 may be used in conjunction with a method 72 to secure, move or relocate, and release an electrical service cable 31. In a first step 74, a user (not shown) may place the electrical service cable 31 between the first and second jaws 14, 16 of the cable handling apparatus 10. To do so, the user may first need to separate the first and second cable jaws 14, 16 and place them in an opened position 20 to create room for the cable 31. In an embodiment wherein the cable handling apparatus 10 is provided with a cable insulator 30, the user would first position the cable insulator 30 around service cable 31. Service cable 31 (i.e., with or without the cable insulator 30) may then be placed in first cable jaw 14. Second cable jaw 16 may then be moved to the closed position 18 at step 76. When fully in the closed position 18, flange 26 will abut bracket 24, with the holes 64 and 70 being generally aligned with one another.

Now at step 78, the user may lock the cable jaws 14, 16 in the closed position 18. In an embodiment, the user may perform this action by inserting fasteners 28, such as bolts 90 and nuts 92, through the aligned holes 64, 70 of the bracket 24 and flange 26. Having secured the cable jaws 14, 16 in the closed position 18, the user may, at step 80, move the cable 31 to a new location or orientation by means of the cable handling apparatus 10. The user may accomplish this by, for example, attaching or engaging the bale 42 of cable handing apparatus 10 to a suitable vehicle.

After moving the cable 31 to a new location, the user may proceed to step 82 and unlock the cable jaws 14, 16 by removing the fasteners 28. This unlocks the lock assembly 22 and permits the user to move, at step 84, the cable jaws 14, 16 to the opened position 20. The cable 31 is now accessible and the user may remove the cable 31 from the jaws of the cable handling apparatus 10 at method step 86. Cable insulator 30 may also be removed. The method 72 now terminates at step 88.

Having herein set forth preferred embodiments of the present invention, subsequent suitable modifications may be made thereto which will nonetheless remain within the scope of the invention. The invention shall therefore only be construed in accordance with the following claims:

The invention claimed is:

1. Cable handling apparatus, comprising: a frame; a first cable jaw mounted to said frame; a second cable jaw moveably mounted to said first cable jaw so that said first and second cable jaws may be moved with respect to one another between an opened position and a closed position; and a lock assembly operatively associated with said first and second cable jaws, said lock assembly locking said first and second cable jaws in the closed position,
- wherein said first cable jaw comprises a generally elongate member having a generally semi-cylindrically shaped inside surface and wherein said second cable jaw comprises a generally elongate member having a generally semi-cylindrically shaped inside surface, the semi-cylindrically shaped inside surfaces of said first and second cable jaws being sized to receive a cable when said first and second cable jaws are in the closed position,
- wherein said lock assembly further comprises: a bracket having a first end and a second end, the first end of said bracket being mounted to said first cable jaw, the second end of said bracket being mounted to said frame so that said bracket secures said first cable jaw to said frame; and a flange having a first end and a second end, the first end of said flange being mounted to said second cable jaw, the second end of said flange engaging said bracket when said first and second cable jaws are in the closed position,
- wherein said bracket and said flange define respective holes therein, the holes in said bracket and flange being substantially aligned when said first and second cable jaws are in the closed position and wherein said lock assembly further comprises a fastener sized to be received by the holes in said bracket and flange, said fastener holding said bracket and flange together when said first and second cable jaws are in the closed position,
- a hinge having a first leaf and a second leaf, the first leaf of said hinge being mounted to said first cable jaw and the second leaf of said hinge being mounted to said second cable jaw, said hinge pivotally connecting together said first and second cable jaws,
- wherein said frame comprises: a first arm having a proximal end and a distal end, the proximal end of said first arm being mounted to the second end of said bracket; a second arm having a proximal end and a distal end, the proximal end of said second arm being mounted to the second end of said bracket; and a cross member mounted between said first and second arms at a position between the respective proximal and distal ends of said first and second arms so that said frame comprises a generally A-shaped configuration.

2. The cable handing apparatus of claim 1, wherein said second cable jaw is pivotally mounted to said first cable jaw.

3. The cable handling apparatus of claim 1, further comprising a cable insulator sized to be received by said first and second cable jaws, said cable insulator being sized to fit over a cable, said cable insulator being interposed between the cable and said first and second cable jaws when said first and second cable jaws are in the closed position.

4. The cable handling apparatus of claim 3, wherein said cable insulator is comprised of rubber.

5. The cable handling apparatus of claim 1, wherein said first and second cable jaws comprise respective halves cut from a circular steel pipe.

6. The cable handling apparatus of claim 1, wherein said fastener comprises a bolt and a nut.

7. The cable handing apparatus of claim 1, wherein said first and second arms and said cross member comprise metal bars.

8. The cable handling apparatus of claim 1, further comprising a bail member mounted between the distal ends of said first and second arms, said bail member allowing said cable handling apparatus to be releasably secured to a cable moving system.

9. The cable handling apparatus of claim 8, wherein said bail member comprises a rigid member.

10. The cable handling apparatus of claim 9, wherein said rigid member comprises a metal bar.

11. The cable handling apparatus of claim 8, wherein said bail member comprises a flexible member.

12. The cable handling apparatus of claim 11, wherein said flexible member comprises a polyethylene rope.

* * * * *